United States Patent [19]
Mattson

[11] Patent Number: 5,622,078
[45] Date of Patent: Apr. 22, 1997

[54] LINEAR/HELIX MOVEMENT SUPPORT/SOLAR TRACKER

[76] Inventor: Brad A. Mattson, 1805 Dogwood, North Las Vegas, Nev. 89030

[21] Appl. No.: 519,156

[22] Filed: Aug. 21, 1995

[51] Int. Cl.⁶ ............................. F16H 25/16; F24T 2/38
[52] U.S. Cl. ................... 74/89.15; 74/99 A; 126/577; 126/604; 126/606; 248/183.1; 248/278.1
[58] Field of Search ................. 74/89.15, 99 A; 126/571, 577, 604, 605, 606, 607; 248/183.1, 278.1

[56] References Cited

U.S. PATENT DOCUMENTS

| | | | |
|---|---|---|---|
| 2,278,356 | 3/1942 | Livingston | 248/278.1 |
| 2,974,646 | 3/1961 | Miller. | |
| 2,998,805 | 9/1961 | Usab. | |
| 3,143,932 | 8/1964 | Lanman. | |
| 3,264,949 | 8/1966 | Dietlin. | |
| 3,315,413 | 4/1967 | Beecher et al. | 74/89.15 |
| 3,319,925 | 5/1967 | Kojima. | |
| 3,450,382 | 6/1969 | Calim. | |
| 3,508,472 | 4/1970 | Hartwick. | |
| 3,776,106 | 12/1973 | Pish | 74/99 A X |
| 3,952,604 | 4/1976 | Baudler. | |
| 4,195,905 | 4/1980 | Hansen | 126/605 |
| 4,202,321 | 5/1980 | Volna | 74/86 X |
| 4,282,442 | 8/1981 | Massinger. | |
| 4,359,932 | 11/1982 | Childers. | |
| 4,383,520 | 5/1983 | Huebl et al. | 126/605 |
| 4,504,038 | 3/1985 | King. | |
| 4,625,709 | 12/1986 | Brandstatter | 126/608 X |
| 4,651,969 | 3/1987 | Dowdall. | |
| 4,711,156 | 12/1987 | Kayyod. | |
| 5,118,058 | 6/1992 | Richter | 248/278.1 X |
| 5,134,923 | 8/1992 | Wexler. | |

FOREIGN PATENT DOCUMENTS 93662   11/1983   European Pat. Off. ............... 126/604

OTHER PUBLICATIONS

Wattsun active solar tracker, p. 114.
Zomeworks passive solar tracker, p. 116.

*Primary Examiner*—Charles A. Marmor
*Assistant Examiner*—Troy Grabow

[57] ABSTRACT

A series of inner fitted pipes with linear and helical guides or opposing helical guides for converting linear to rotational motion or converting rotational to linear motion of a support device. Hydraulics or electric screw drives are used to power the linear motion and then is converted to rotational adjustments of a directing or lifting support. This rotational support is capable of being used as a solar tracker, a robot, an exercise machine and a lift.

15 Claims, 8 Drawing Sheets

5,622,078

LINEAR/HELIX MOVEMENT SUPPORT/SOLAR TRACKER

BACKGROUND—TECHNICAL FIELD

This invention relates to movement supports, such as robot arms and solar trackers that automatically track the sun, specifically converting linear motion via helical guides into rotational movement of supports, with possible potential of the inverse for use in exercise equipment.

BACKGROUND—CROSS-REFERENCE TO RELATED APPLICATION

This invention can utilize the hydraulics and/or guidance system electronics of my U.S. Pat. No. 5,512,742.

BACKGROUND—DESCRIPTION OF RELATED ART

Movement supports and solar trackers in the past have employed geared stepping motors at axis points, hydraulic and screw rams for leverage, and liquid weight tranfer methods. Other linear to rotary inventions have been designed in a myrid of methods and applications.

My search revealed U.S. Pat. Nos. 2,974,646 to Miller (1961); U.S. Pat. No. 2,998,805 to Usab (1961); U.S. Pat. No. 3,143,932 to Lanman (1964); U.S. Pat. No. 3,264,949 to Dietin (1966); U.S. Pat. No. 3,319,925 to Kojima (1967); U.S. Pat. No. 3,450,382 to Calim (1969); U.S. Pat. No. 3,508,472 to Hartwick (1970); U.S. Pat. No. 3,776,106 to Pish (1973); U.S. Pat. No. 3,952,604 to Baudler (1976); U.S. Pat. No. 4,282,442 to Massinger (1981); U.S. Pat. No. 4,359,932 to childers (1982); U.S. Pat. No. 4,504,038 to King (1985); U.S. Pat. No. 4,651,969 to Dowall (1987); U.S. Pat. No. 4,711,156 to Kayyod (1987); U.S. Pat. No. 5,134,923 to Wexler (1992). Other pertinent devices are the Wattsun active tracker, and the Zomeworks passive tracker.

The afore mentioned patents and trackers have been designed in many different archaic ways and applications. The disadvantages of the patents and trackers are:

(a) The use of geared stepping motors at the axis points necessitates sophisticated manufacturing techniques.
(b) The use of levers and linear actuators invites liabilities and limits the range of rotation.
(c) The use of liquid weight transfer doesn't provide enough holding power on windy days.
(d) The use of compact bolt on rotational actuators would not have enough torque to withstand the loads of movement supports.

OBJECTS AND ADVANTAGES

Accordingly, besides the objects and advantages of the devices and inventions described, several objects and advantages of the present invention are:

(a) To provide a linear/helix rotational positioning system in which the manufacturing is unpretentious.
(b) To provide a positioning support system in which it can encompass a wide scope of travel and free of deleterious moving parts.
(c) To provide a solar tracker that has adequate power to withstand high winds while tracking.
(d) To provide a solar tracker/movement support in which the linear to rotation imparting mechanism is an integral part of the support.

Further objects and advantages of the movement support are to provide a very economical positioning system, a highly accurate system, and an aesthetically pleasing unit. Subsequent, objects and advantages will become apparent within the ensuing drawings and description.

DRAWING FIGURES

DESCRIPTION OF THE PREFERRED EMBODIMENTS

Figure 1:
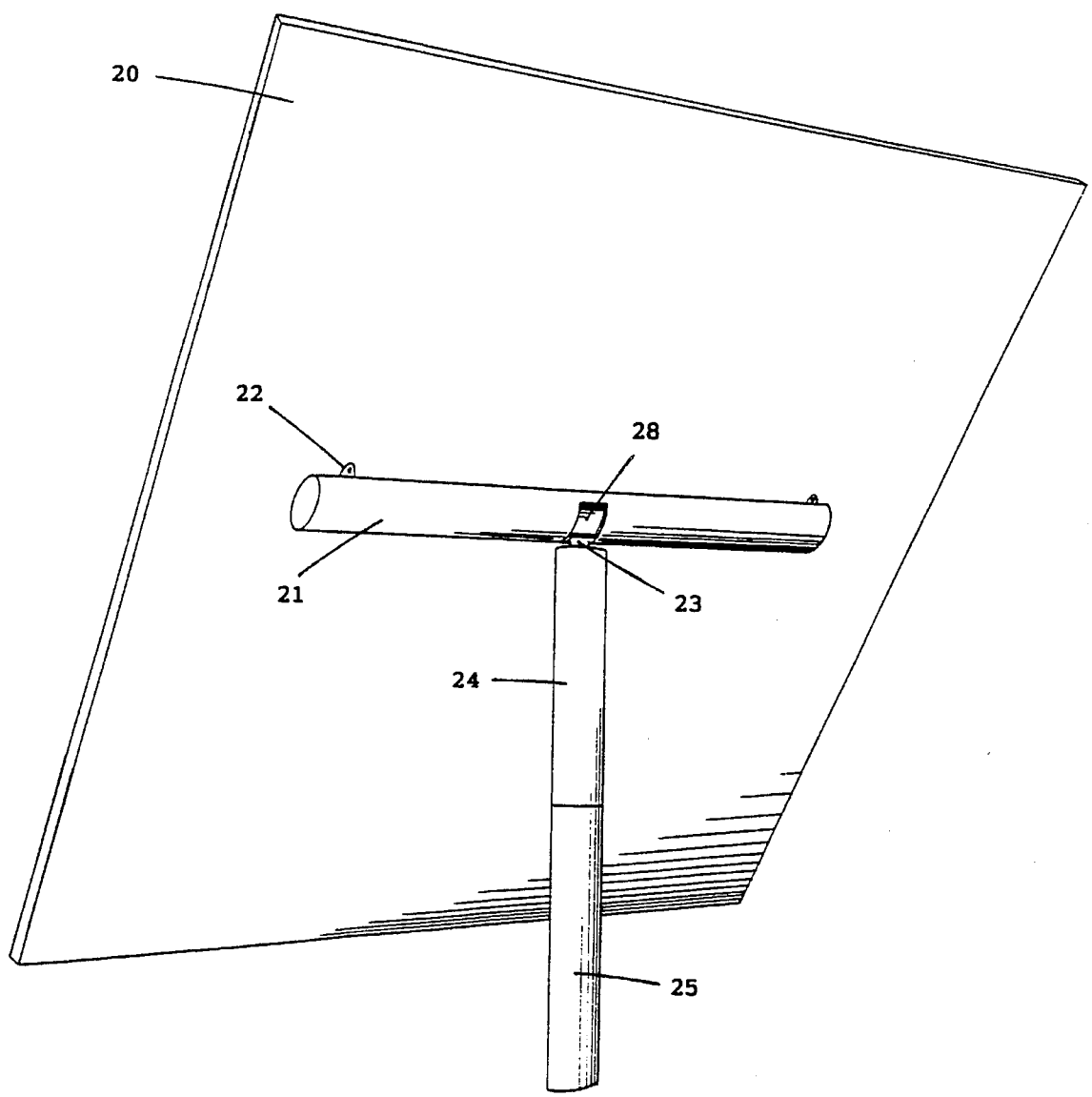
FIG. 1 shows a perspective view of the movement support utilized as a solar tracker.

A typical embodiment of the linear/helix rotational support of the present invention is illustrated in FIG. 1, a perspective view utilized as a dual axis solar tracker. A photovoltaic solar collector 20 is mounted on a retaining pipe (retaining means) 21 by bolts (not shown) through a set of mounting ears 22. The retaining pipe 21 rotates the collector 20 from vertical to horizontal within a 2nd axis mount access 28. The inner workings of the retaining pipe 21 are attached to a 2nd axis mount 23. A 1st axis rotation pipe (rotational cylinder) 24 rotates the collector 20 from east to west on a stationary pipe (stationary cylinder) 25.

Figure 2:
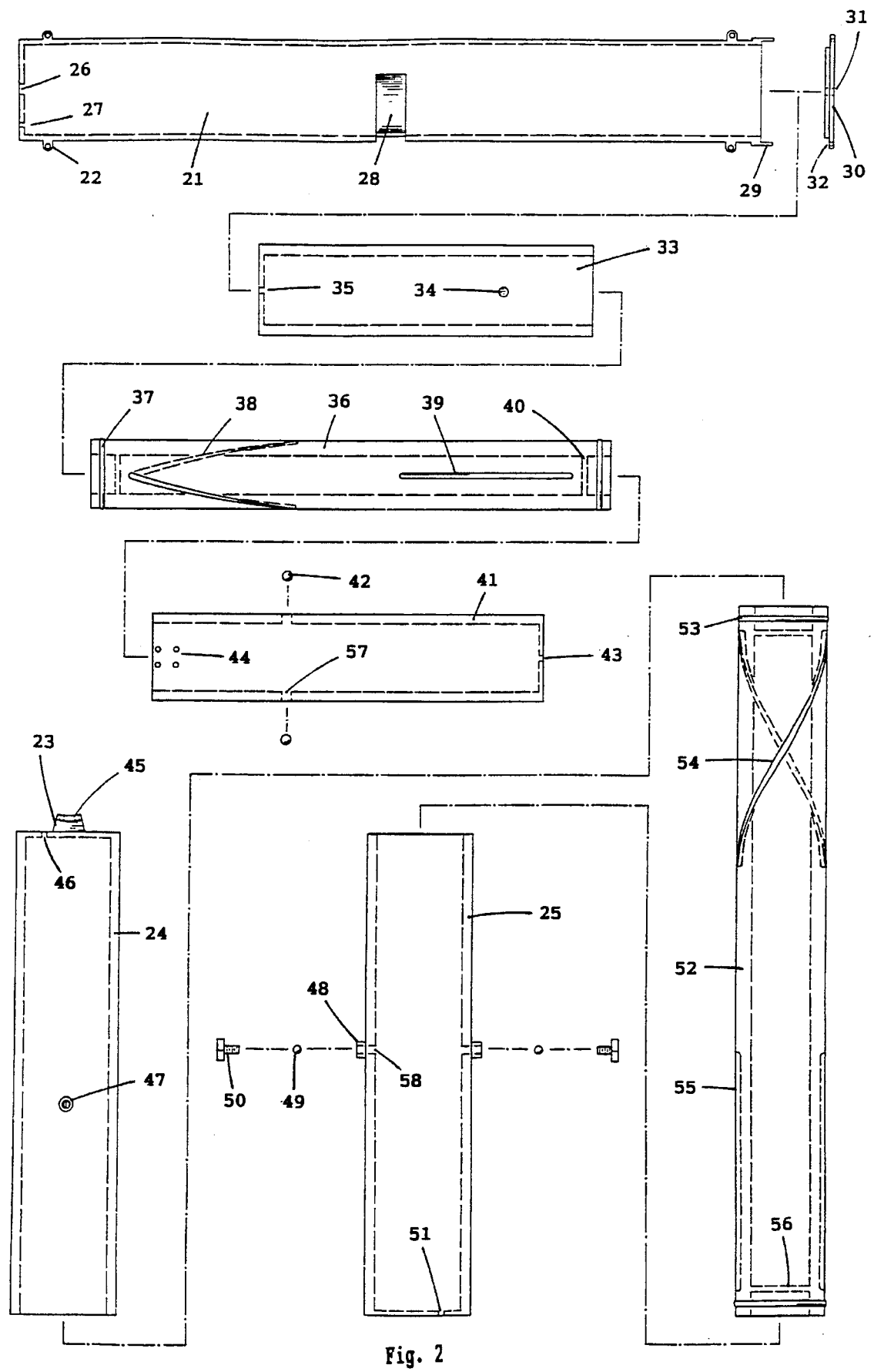
FIG. 2 shows an exploded version of a hydraulically driven movement support with linear and helical channels.

FIG. 2 shows an exploded view of a hydraulically driven linear and helical guided rotational support as depicted in FIG. 1. (Note: Similar parts are turned 90° from each other for clarity.) The movement support is a series of round metal pipes that are fitted inside of one another. A 1st linear/helix pipe (inner cylinder) 52 is a pipe with two round plates 56 welded just inside the ends of pipe 52 producing a sealed cavity in the middle and two small cavities on each end. The pipe 52 is placed in a lathe/milling machine that cuts a circumventing channel ion each end where a pair of o-rings 53 are installed. Then a pair of round linear channels 55 are cut lengthwise on the opposing sides of pipe 52. On the other end a pair of round helical channels (cam grooves) 54 are cut on opposing sides.

The stationary pipe (cylinder) 25 which is approximately two thirds the length of the pipe 52 with an outside diameter (O.D.) slightly smaller than the inside diameter (I.D.) of pipe 52 is obtained. The stationary pipe 25 has a plate welded flush with its bottom and a west fitting hole 51 is drilled and taped through the plate A pair of ball holes 58 are drilled on opposing sides of pipe 25, which are at a height corresponding with the distance of the top of the linear channels 55 if pipe 52 is placed inside pipe 25. A pair of nuts 48 are welded over the holes 58. The stationary pipe 25 is then permanently set in the vertical position shown with the nuts 48 facing east and west. The pipe 52 is placed inside the pipe 25 with the channels 55 lined up with the holes 58. A pair of steel balls (cam followers) 49 are placed inside and a pair of bolts 50 are threaded into nuts 48. The balls 49 are kept half way in their linear channels 55 and half way in the wall of pipe 25. This permits pipe 52 to move only linearly up and down within pipe 25.

The 1st axis rotation pipe 24 is the same length and diameter as the stationary pipe 25, a round plate is welded flush with the top and an east fitting hole 46 is drilled and tapped. Welded on the center of the plate is the 2nd axis mount 23, which is a curved section of pipe and a small plate crafted into a T-shaped platform if viewed 90° of the drawing (See FIG. 3, 23a). A set of four bolt holes 45 are drilled through the curved plate of mount 23. A pair of ball anchors 47 are crafted, just like holes 58 and nuts 48 of the stationary pipe 25, only with the height determined by the top of the helical channels 54. The pipe 24 is placed over the remaining part of pipe 52, the anchors 47 are lined up with the channels 54 and a pair of balls and bolts (not shown) just like balls 49 and bolts 50 of pipe 25 are installed.

With weight applied on top of mount 23, pipe 24 will be kept from rising and separating from pipe 25 when in operation. When the 1st linear/helix pipe 52 is driven linearly by hydraulics it is prevented from rotation by the linear channels 55 in the stationary pipe 25 and the helical channels 54 rotate the 1st axis rotation pipe 24 180°. (Note: Only 180° are shown for simplicity; 240° are needed at 35° latitude.)

A 2nd linear/helix pipe 36 is crafted, with a pair of channels and o-rings 37, a pair of round plates 40, and a pair of linear channels 39, in the same fashion as the 1st linear/helix pipe 52. A pair of helical channels 38 are cut only 90° on pipe 36 instead of 180° on pipe 52.

A linear end pipe 41 is crafted in the same porportions and ways as the stationary pipe 25 except the nuts 48 are deleted. An up fitting hole 43 is centered on the plate and a set of four 2nd axis mounting holes 44 are drilled and tapped on one side of the pipe 41 to match holes 45 on the mount 23. Pipe 41 is slipped over pipe 36 and a pair of balls 42 are stuck with grease into a pair of ball holes 57 and the linear channels 39.

A helical end pipe 33, with a down fitting hole 35 and a pair of ball holes 34, is crafted exactly the same as pipe 41, except the pipe is cut to eliminate holes 44. The end pipe 33 is slipped over the remaining part of pipe 36 and two balls (not shown) are stuck into the holes 34 and the helical channels 38 with grease.

The retaining pipe 21 has an I.D. slightly larger and a length slightly longer than the O.D.s and lengths of pipes 33 and 41. A round plate is welded on one end Of pipe 21, a down access hole 26 is drilled in the center of the plate, and a set screw hole 27 is drilled and tapped. In the center of pipe 21 is the 2nd axis mount access 28, which is cut out slightly wider than the mount 23 and is approximately 90° plus the length of the mount 23. The mounting ears 22 are crafted and welded so that they are flush with a tangent of the retaining pipe 21. A set of bolts 29 are welded onto the open end of pipe 21 to match a set of holes 32 in an end plate 30 with a up access hole 31 drilled in the center.

The assembly of pipes 33, 41, and 36 are then inserted inside the retaining pipe 21. With the holes 44 lined up with the access 28 the plate 30 is installed and the nuts (not shown) are tightened on the bolts 29. Then the holes 44 are lined up with the holes 45 and the bolts (not shown) are installed to affix the 2nd axis assembly to the 1st axis assembly. A set screw (not shown) is then threaded into the hole 27 and tightened to secure pipe 21 to pipe 33.

With the pipe 41 stationary in relation to the mount 23 and the balls kept half way in their channels and half way in their pipe walls by the inside wall of pipe 21. The hydraulics will move pipe 36, thus rotating pipe 33 which rotates the retaining pipe 21 relative to the mount 23 Via the set screw (not shown).

For another embodiment the following should be understood. A simple hydraulically operated single axis solar tracker or other lifting/rotating supporting device can be made with some of the above described parts. The pipe 52 is affixed stationary in its vertical position and the helical channels reversed. The pipe 24 is then installed onto pipe 52 as allready demonstrated. The collector 20 is fixed directly to mount 23 in an approximate 45° angle. With no pressure in the system the collector 20 would be facing east, as fluid is introduced the collector 20 will turn longitudinally and upward to the west. When the sun goes down the pressure would be released and the system would slowly return facing east.

Figure 3:
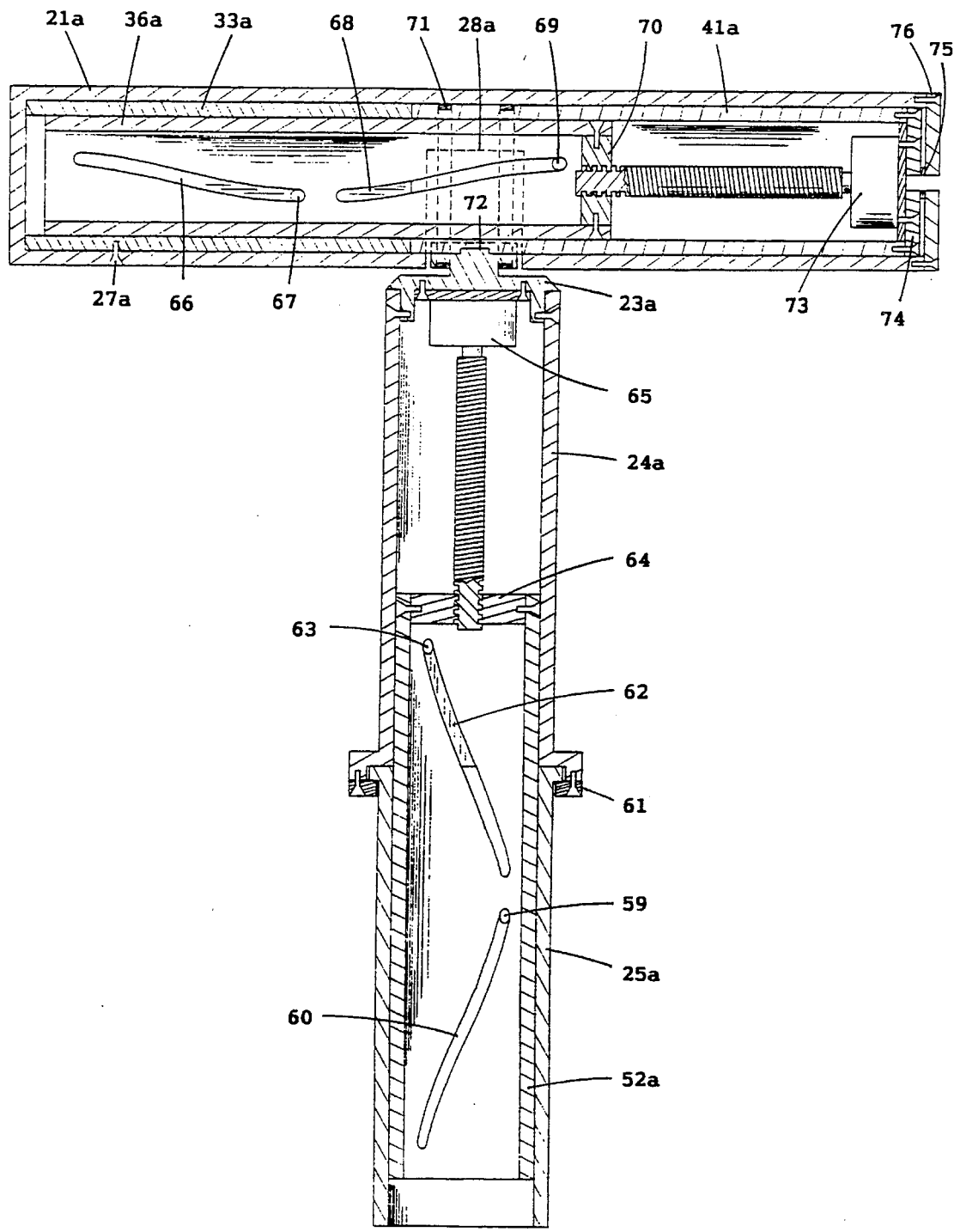
FIG. 3 shows a cross sectional view of the movement support demonstrating electric screw drives and helical slots.

FIG. 3 shows a cross sectional view of another embodiment of the rotational movement support demonstrating electric screw drives and opposing helical slots. In this figure the very similar parts are numbered with the same numbers as in FIG. 2 along with the alphabetical suffix (a). The helical slots in this figure are cut into only one wall instead of pairs. If pairs were to be done the integrity of the pipe would be compromised, which is why FIG. 2 demonstrated channels in thicker walled pipe.

A stationary pipe 25a is a permanent vertical pipe with a retaining lip welded on the top edge. In tropical latitudes it will be cotter pinned to another pipe so that it can be rotated 180° every six months. A helical drive pipe (inner cylinder) 52a has two opposing helical slots (cam grooves) cut through one wall of pipe 52a. One being a stationary drive helix 60 and the other a dependent drive helix 62. A screw drive insert 64 is fastened to the inside of pipe 52a to accept a screw drive motor assembly 65 which moves the pipe 52a linearly up and down.

A 1st axis rotation 24a is the same diameter as pipe 25a and has a retaining offset welded to the lower end for a retaining ring 61 to be fastened. The retaining ring 61 is necessary when insufficient weight is on the tracker to prevent the 1st axis pipe 24a from separating from pipe 25a. A 2nd axis mount 23a is attached to the top of pipe 24a and provides an accessible mount for the motor assembly 65 and to hold the second axis assembly.

Pipe 25a has a pin (cam follower) 59 pressed through a hole and into slot 60 and pipe 24a has a pin (cam follower) 63 pressed into slot 62. When the screw motor assembly 65 is activated the insert 64 is drawn up, thus moving the drive pipe 52a upward. The slot 60 will turn pipe 52a in a clockwise direction if viewed from above, concurrently the slot 62 will push pin 63 in a clockwise direction along with the turning of the drive pipe 52a, thus turning the 1st axis pipe 24a from east to west.

The second axis assembly is basically the same as the first axis assembly, except that it is incased in a retaining pipe 21a which prevents the expansion of the inner workings. A 2nd stationary pipe 41a is secured to the mount 23a, which has a curved rest to match (See FIG. 2, 23) and a key way 72 to prevent pipe 41a from rotating. The pipe 41a has recessed channels circumventing the O.D. for a pair of high strength steel straps 71 that are threaded in and under the mount 23a and tightened, like banding straps on wooden crates. A 2nd axis mount access 28a shown by hidden lines is a space cut out of pipe 21a so that the pipe can rotate without hitting the mount 23a. A 2nd screw motor assembly 73 is secured to a end plate 74 that is attached to the far end of pipe 41a.

A 2nd drive pipe 36a is just like drive pipe 52a, except the helical slots add to 90° instead of 180° is fitted into pipe 41a. A screw drive insert 70 is secured to the inside of pipe 36a to accept the screw motor assembly 73. A 2nd axis rotation pipe 33a is fitted over pipe 36a and pin 67 is pressed through a hole and into a dependent drive slot 66. A pin 69 is pressed through a hole in pipe 41a and into a stationary drive slot 68. The retaining pipe 21a encompasses the whole assembly with a set screw (not shown) in the hole 27a, securing pipe 33a to pipe 21a. An end plate 76 seals the open end of pipe 21a and provides a mount for a thrust washer 75.

When the screw motor assembly 73 is activated the pipe 41a (a stationary cylinder) does not move and the drive pipe 36a (an inner cylinder) is drawn to the right which rotates as if rolling toward the Viewer, via the slot 68 and pin 69. The slot (cam groove) 66 and pin (cam follower) 67 concurrently with the drive pipe 36a add to the rotation of pipe 33a. The retaining pipe 21a is secured to the pipe 33a via the set screw (not shown), thus rotating the retaining pipe 21a relative to the mount 23a. This embodiment can also be used partly as a single axis tracker as discussed after FIG. 2, expanding and rotating or just rotating.

Figure 4:
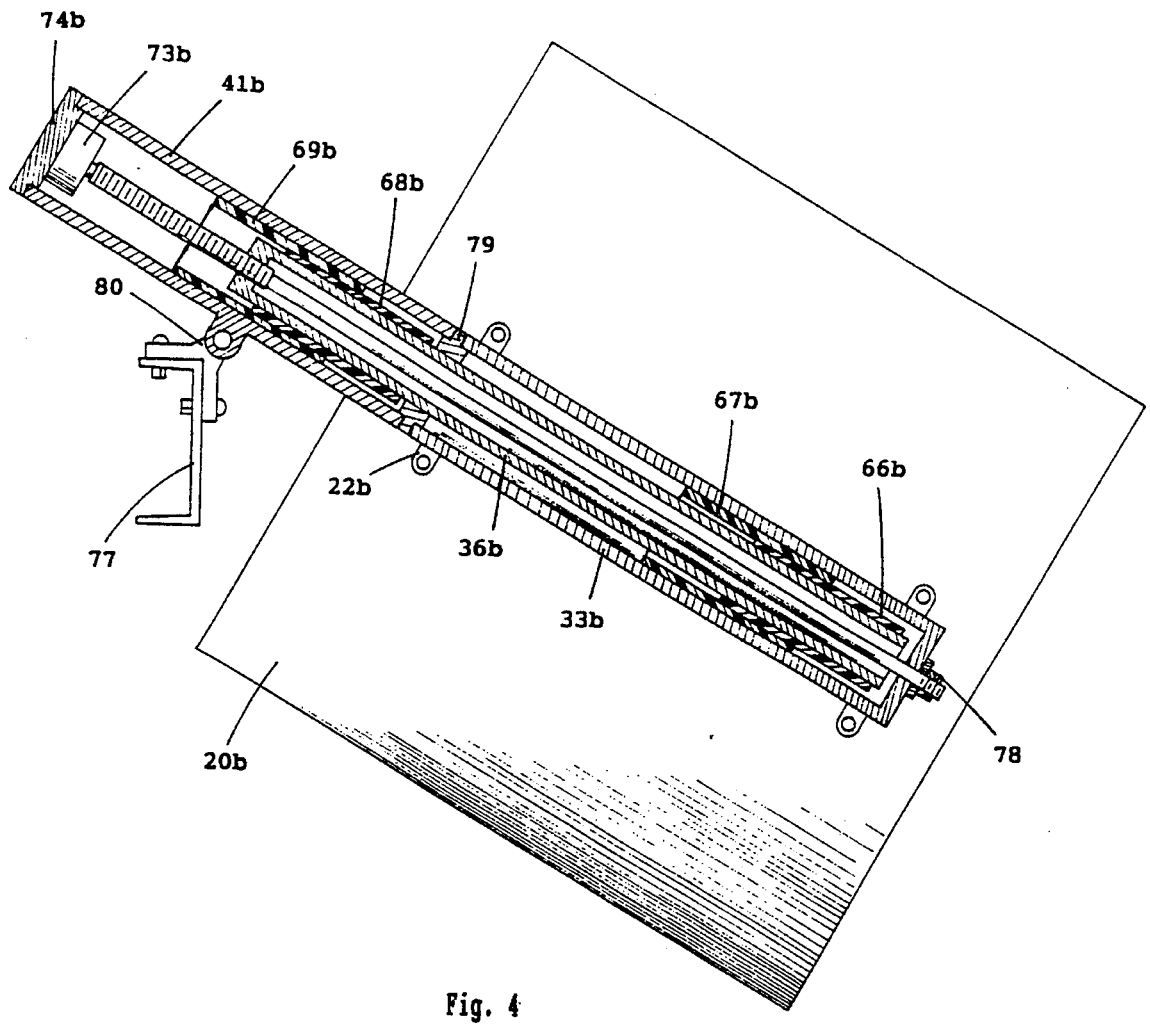
FIG. 4 shows a cross sectional view of a single axis tracker utilizing splined sleeves and screw rod retaining.

FIG. 4 shows across sectional View of a single axis tracker utilizing splined sleeves and a screw rod retaining means. In FIG. 4 the similar parts are numbered with the same numbers as in FIGS. 1, 2, & 3 along with the alphabetical suffix (b).

A beam of a billboard 77 is viewed as if looking east with an adjustable mount 80 bolted to the beam 77. A stationary pipe 41b is set at an approximate 30° angle via an ear to mount 80. A screw motor assembly 73b is attached to a end plate 74b, which is attached to one end of the stationary pipe 41b. A rotation pipe 33b is at the other end of pipe 41b and separated by a bushing 79. The screw motor assembly 73b is an electric motor with a long shaft part of which is a treaded into the end of a drive pipe 36b and the other to hold the pipe 41b and 33b from expanding by a washer and lock nuts 78.

This figure demonstrates how more conventional pipes can be used without tight tolerances. These spaces are filled by nylon interlocking male and female helical splined sleeves in a fashion as in FIG. 3. A stationary male sleeve 68b is affixed to pipe 36b and interlocks into a stationary female drive sleeve 69b that is affixed to pipe 41b. A dependent male sleeve 66b is affixed to pipe 36b and interlocks into a dependent female sleeve 67b that is affixed to pipe 33b. A set of mounting ears 22b are welded to the pipe 33b for the attachment of a PV collector 20b. This system works on the same principle as the slots and pins of FIG. 3, except only with sliding interlocking sleeves.

Figure 5:
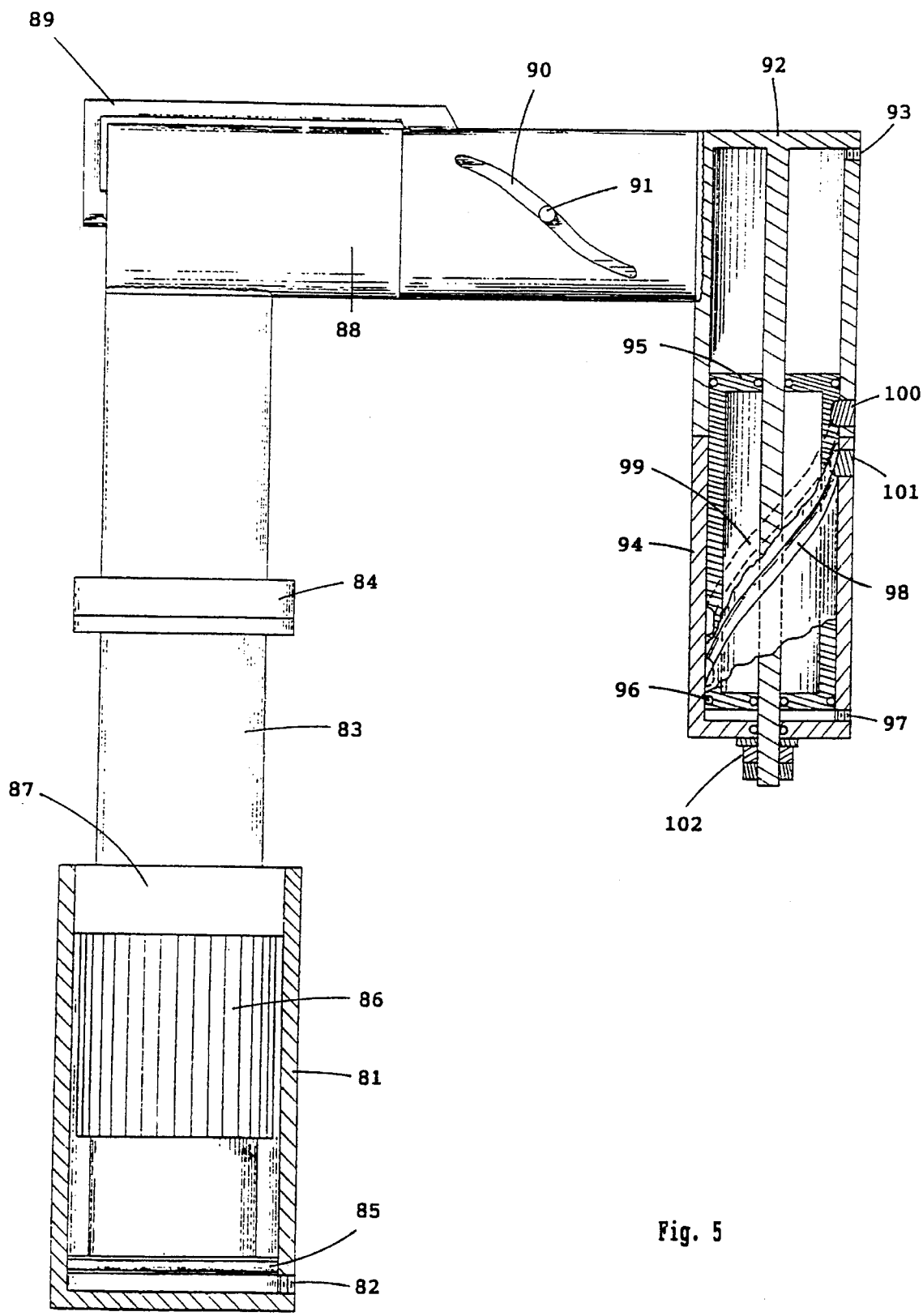
FIG. 5 shows a robot arm/lift demonstrating numerous aspects.

FIG. 5 shows a robot arm/lift demonstrating a number of different aspects of a unipod-like structure. A cylinder 81 with an open end upward is affixed in the vertical position. A female linear splined sleeve 87 is attached to the open end of cylinder 81 and a male linear splined sleeve 86 is attached to the outside of a typical rotation support 83. A round plate and o-ring 85 is affixed to the bottom of support 83. When hydraulic pressure is fed into a fitting hole 82 the support 83 will move only linearally upward via the inerlocking sleeves 86 and 87. The support 83 rotates at a retaining collar 84. A second rotating member 88 is welded to the top of support 83 and demonstrates a retaining arm 89 of an external fashion and an external slot 90 and pin 91.

A third rotating support 92 is welded to the second member 88. The support 92 is a pipe with a round plate welded to one end and a round rod welded to the center that secures a pipe 94 by a set of nuts and a washer 102. A drive pipe 95 is a pipe with sealed ends and holes. The chambers are sealed by a set of o-rings 96. A helical channel 99 is cut on the back side of pipe 95 and a opposing helical channel 98 is cut on the facing side of pipe 95. An elongated pin 100 is pressed through pipe 92 and into channel 99 and an elongated pin 101 is pressed through pipe 94 and into channel 98. Hydraulic pressure is fed through a pair of fitting openings 93 and 97. A tool is to be welded to the pipe 94 and would be capable of moving within four axes.

Figure 6:
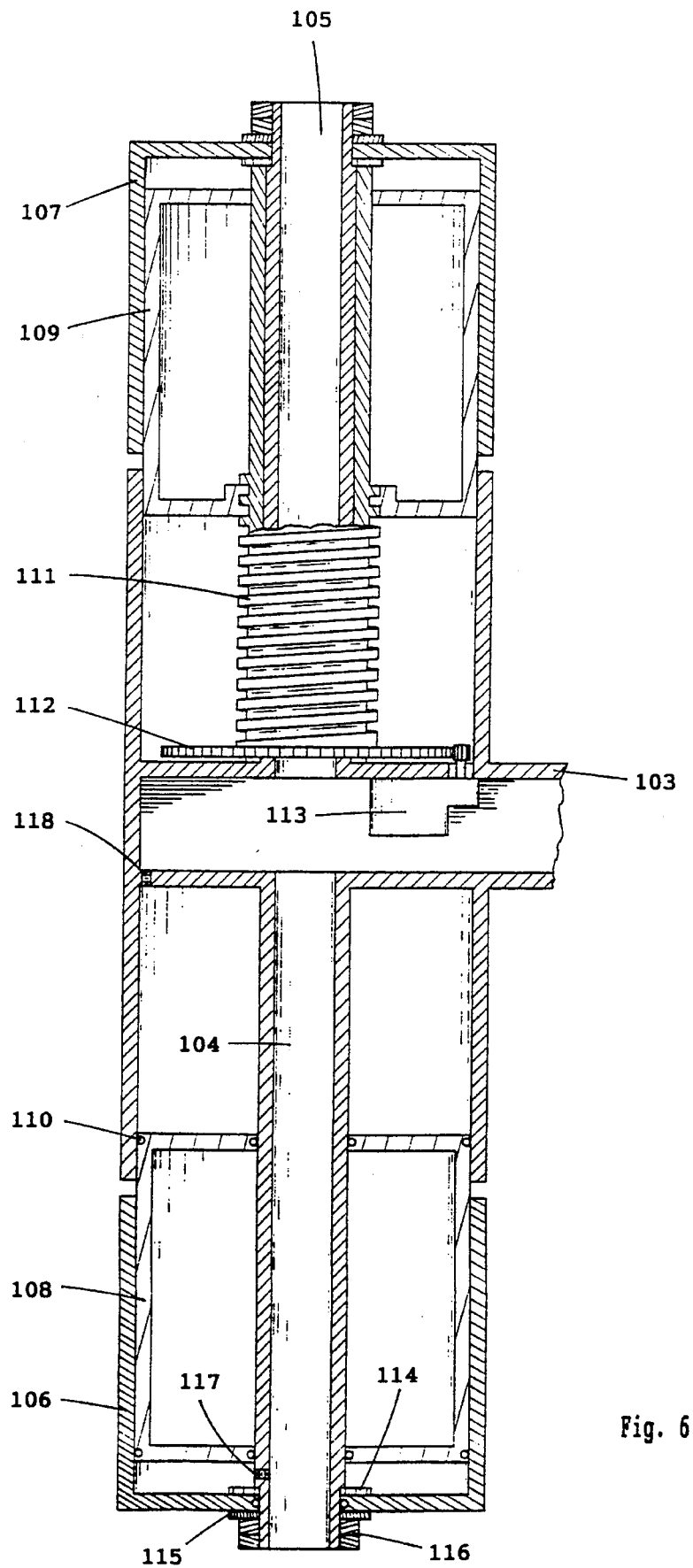
FIG. 6 shows independent rotating arms with central access.

FIG. 6 shows a cross section of a rotational support with independent rotating arms and central accesses for tool feeds. A housing 103 is fabricated with metal, first a flattened square box is welded together and two holes drilled on either side. Over these holes are welded a tube 104 and a tube 105. Two cylinders are then welded to the box. A drive pipe 108 with two end plates is crafted with two central holes on each end to be fitted onto tube 104. (Note: The drive pipes do not show helical guides and pins which are similar to those shown in FIG. 5.) A rotation pipe 106 is made to fit onto drive pipe 108 and tube 104. The system is sealed by a set of o-rings 110 and is hydraulically fed by a pair of fitting holes 117 and 118. The tube 104 is recessed so that a thrust washer 114 can hold back rotation pipe 106, thus providing a tighter radius than abutting against the other cylinder. Another thrust washer 115 prevents the rotation pipe 106 from moving the other direction and is kept in place by a pair of lock nuts 116.

The upper end is basically the same as described above except that it's driven by an electric motor 113. A half threaded propulsion tube 111 with a flat round gear 112 rotates over a tube 105. A drive pipe 109 like pipe 108 is made with female threads to interlock with the tube 111. The motor 113 will turn the gear 112, thus rotating tube 111 which draws pipe 109 and turns a rotation pipe 107 via helical means shown in previous figures. It should be noted that where central access and synchronized electric driven arms are needed, that a geared drive can be placed at hole 118 to connect a pair of gears 112 on both sides.

Figure 7:
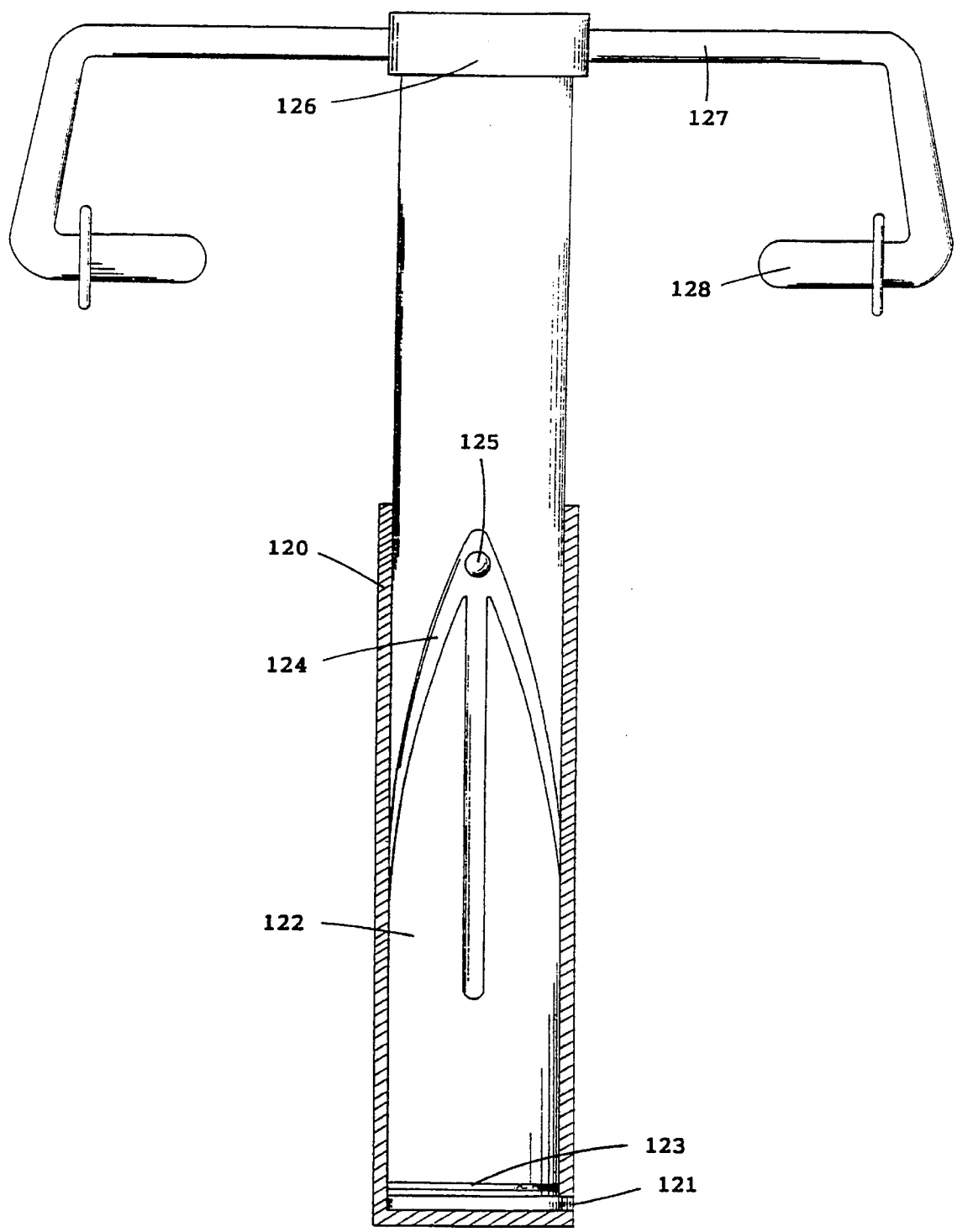
FIG. 7 shows an exercise unipod.

FIG. 7 shows an exercise unipod with a cross section of a vertical cylinder 120. The cylinder 20 has a fitting hole 121 in which a fluid is restricted from flowing in and out. A moveable pole 122 fits inside cylinder 120 and makes a seal via an o-ring 123. The pole 122 has an arrow shaped round channel 124 cut into it, in which a ball 125 is interlocked as described in FIG. 2 to cylinder 120. An adjustable collar 126 holds a set of handle bars 127 to the pole 122. When a pair of hand grips 128 are moved up and down or rotationally following the channel 124 a restricted movement occurs.

Figure 8:
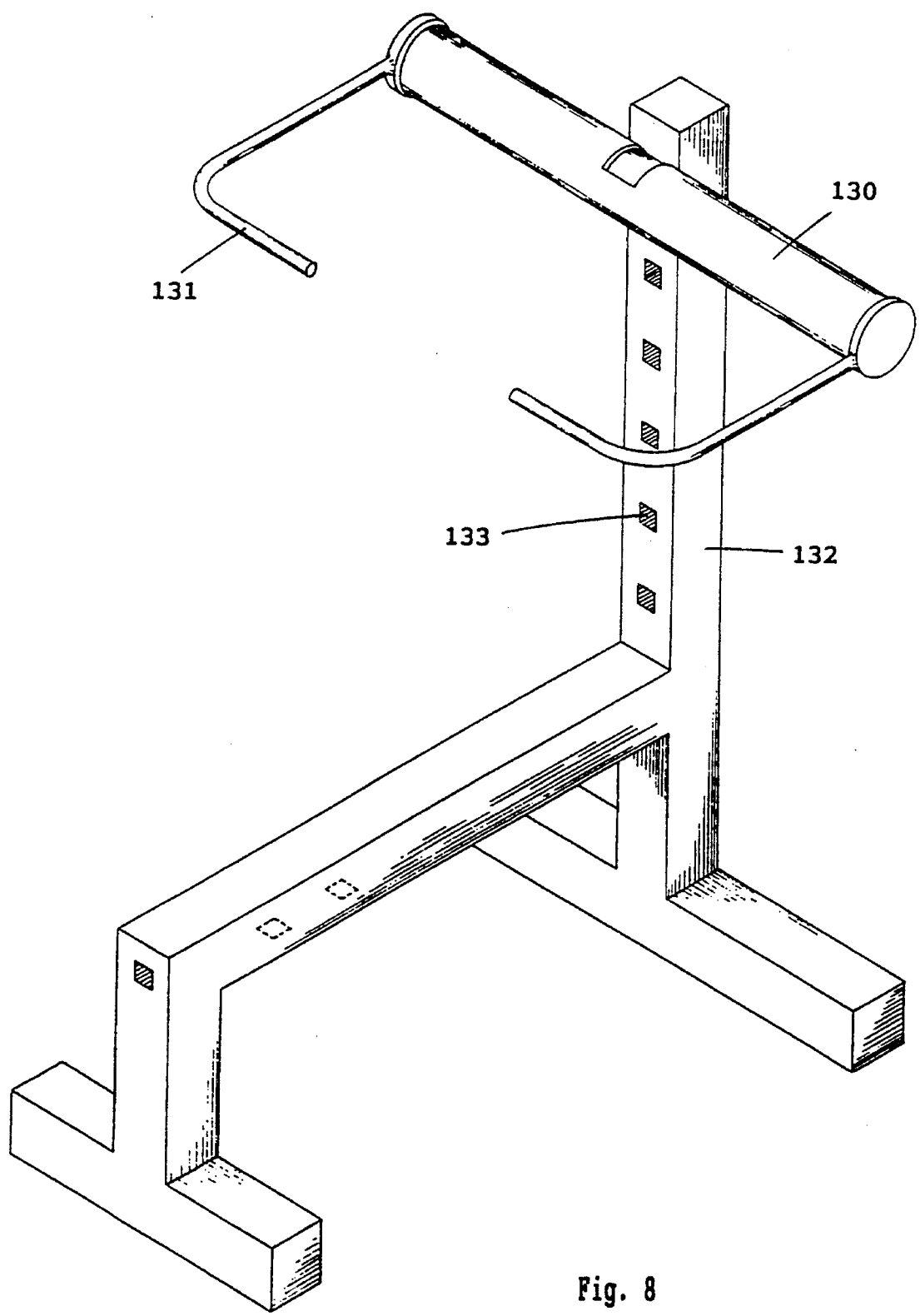
FIG. 8 shows how the unit can be locked into a multipurpose work out bench.

FIG. 8 shows how a rotational movement support 130 can be used on a multipurpose work out bench 132. The support 130 can be locked into a number of holes 133 for different exercise uses. A set of handle bars 131 are adjustably attached to the support 130. The support 130 is designed like FIG. 2 with a line (not shown) connected from one chamber to the other and if needed a set of conventional reed check valves and adjustable restriction valves can be put in line to regulate pressures applied in different directions.

SUMMARY, RAMIFICATIONS, AND SCOPE

Accordingly, the reader will see that the rotational movement support is unpretentious in it's manufacture and is capable of reaching the full trajectory of the sun. It provides a very powerful postioning system and the linear/helical/ rotational imparting unipod is an integal part of the supporting means. Furthermore, the rotational movement support has the additional advantages in that it provides a linear/rotational convertion system incased in common pipe without the need of bearings.

it provides an inexpensive dual or single axis tracker.

it provides an aesthetically pleasing system.

it provides a tracker that it's main axis is longitudinal instead of latitudinally, which necessitates a collector that is higher off the ground to prevent the corners from hitting.

it provides a very inexpensive exercise device.

it provides a safe water powered lift for the handicapped to get into and out of swimming pools.

Although the above descriptions contains many specifities, these should not be construed as limiting the scope of the invention, but as merely providing illustrations of some of the presently prefered embodiments of this invention. For example the hydraulic pressure or vacuum can be of any fluid and even produced by solar thermal properties. It should also be recognized that the movement support has all the principles to encompass many exercise equipment designs, such as twisting rowing machines and pectoral devices. The rotational movement support can be designed for many different applications such as lifts for pickups, wide scoped satelite dishs, tracking camera mounts, and celestial observing devices. Also, many of the parts mentioned can be made of plastic with metal sleeves for added strength. Thus, the scope of the invention should be determined by the appended claims herein and their legal equivalents, rather than by the examples given.

I claim:

1. A rotational support comprising:

a stationary cylinder firming the sole base of said support;

a rotational cylinder formed coaxial with said stationary cylinder about a first axis, the rotational cylinder axially abutting said stationary cylinder;

retaining means for preventing axial movement of said rotational cylinder relative to said stationary cylinder, the retaining means functioning solely between the stationary and rotational cylinders without any additional support;

an inner cylinder coaxial about the first axis, the inner cylinder extending axially between said stationary cylinder and said rotational cylinder, the inner cylinder engaging both the stationary and rotational cylinders;

wherein said inner cylinder, stationary cylinder and rotational cylinder have cam grooves and cam followers between the inner cylinder and the stationary and rotational cylinders, so that axial motion of the inner cylinder results in rotational motion of the rotational cylinder.

2. A rotational support as set forth in claim 1 wherein said support is a solar tracker.

3. A rotational support as set forth in claim 1 wherein said support has only one stationary cylinder.

4. A rotational support as set forth in claim 1 including a second axis perpendicular to said first axis.

5. A rotational support as set forth in claim 1 wherein said support is a robot.

6. A rotational support as set forth in claim 1 wherein said support is an exercise machine.

7. A rotational support as set forth in claim 1 wherein said retaining means is a retaining ring coupling abutting ends of said stationary cylinder and said rotational cylinder whereby contributing to the axial alignment of said stationary cylinder and said rotational cylinder and allowing rotational movement between said stationary cylinder and said rotational cylinder.

8. A rotational support as set forth in claim 1 wherein said inner cylinder is driven by an electric driving means.

9. A rotational support as set forth in claim 1 wherein said retaining means is a centrally located hollow cylinder providing an access hole through said support.

10. A rotational support as set forth in claim 1 wherein said retaining means is a centrally located solid cylinder.

11. A rotational support as set forth in claim 1 wherein said retaining means surrounds said stationary and rotational cylinders and is provided with access for a mount to be coupled to said stationary cylinder.

12. A rotational support as set forth in claim 1 wherein said retaining means is the weight of the rotational pipe and any structure attached to the rotational pipe.

13. A rotational support as set forth in claim 1 wherein said cam grooves and cam followers are male and female slidably engaged splined sleeves.

14. A rotational support as set forth in claim 1 wherein said inner cylinder is controlled by a fluid.

15. A rotational support as set forth in claim 1 wherein said retaining means is a centrally located cylinder with a rotationally enveloping cylinder which controls said inner cylinder by an electric driving means.

* * * * *